United States Patent
Theurillat-Bonjour

(10) Patent No.: US 10,409,222 B2
(45) Date of Patent: Sep. 10, 2019

(54) GEARWHEEL FOR CLOCK MOVEMENT

(71) Applicant: ROLEX SA, Geneva (CH)

(72) Inventor: Quentin Theurillat-Bonjour, Cuarnens (CH)

(73) Assignee: ROLEX SA, Geneva (CH)

( * ) Notice: Subject to any disclaimer, the term of this patent is extended or adjusted under 35 U.S.C. 154(b) by 0 days.

(21) Appl. No.: 15/591,533

(22) Filed: May 10, 2017

(65) Prior Publication Data

US 2017/0329282 A1    Nov. 16, 2017

(30) Foreign Application Priority Data

May 12, 2016   (EP) .................................... 16169451

(51) Int. Cl.

| | | |
|---|---|---|
| *G04B 13/02* | (2006.01) | |
| *G06F 17/13* | (2006.01) | |
| *G06F 17/50* | (2006.01) | |
| *F16H 1/06* | (2006.01) | |
| *F16H 55/08* | (2006.01) | |

(52) U.S. Cl.
CPC ......... *G04B 13/026* (2013.01); *G04B 13/027* (2013.01); *G06F 17/13* (2013.01); *G06F 17/5009* (2013.01); *F16H 1/06* (2013.01); *F16H 55/08* (2013.01); *G06F 2217/16* (2013.01)

(58) Field of Classification Search
CPC .. G06F 17/13; G06F 17/5009; G06F 2217/16; G04B 13/026; G04B 13/027; F16H 1/06; F16H 55/08
See application file for complete search history.

(56) References Cited

U.S. PATENT DOCUMENTS

| | | | | |
|---|---|---|---|---|
| 3,918,315 A * | 11/1975 | Rouverol | ............ | F16H 55/0806 74/462 |
| 4,498,335 A * | 2/1985 | Thoma | ................ | G01M 13/021 33/501.9 |
| 4,651,588 A * | 3/1987 | Rouverol | ............ | F16H 55/0806 74/462 |
| 6,712,500 B2 * | 3/2004 | Tu | .......................... | G04B 15/08 368/126 |
| 8,833,192 B2 * | 9/2014 | Helfer | ..................... | F16H 55/08 74/457 |
| 2003/0090962 A1 * | 5/2003 | Tu | .......................... | G04B 15/08 368/124 |
| 2012/0118093 A1 * | 5/2012 | Helfer | ..................... | F16H 55/08 74/462 |
| 2018/0128232 A1 * | 5/2018 | Koeppl | ............... | F02N 11/0851 |
| 2019/0094812 A1 * | 3/2019 | Forsey | ................ | G04B 13/027 |

FOREIGN PATENT DOCUMENTS

| | | |
|---|---|---|
| CH | 699 679 A2 | 4/2010 |
| EP | 2 453 321 A1 | 5/2012 |

OTHER PUBLICATIONS

European Search Report and Written Opinion dated Oct. 21, 2016 issued in counterpart application No. EP16169451; w/ English partial translation and partial machine translation (11 pages).

* cited by examiner

*Primary Examiner* — Sean P Kayes
(74) *Attorney, Agent, or Firm* — Westerman, Hattori, Daniels & Adrian, LLP

(57) ABSTRACT

A gearwheel (R2) for clock movement, suitable for cooperating with a given first gearwheel (R1), wherein it comprises teeth whose flank is defined such that the torque ratio j between the two meshed gearwheels (R1, R2) is constant at least over a given angular pitch.

21 Claims, 4 Drawing Sheets

GEARWHEEL FOR CLOCK MOVEMENT

This application claims priority of European patent application No. EP16169451.8 filed May 12, 2016, the contents of which are hereby incorporated by reference herein in their entirety.

INTRODUCTION

The present invention relates to a method for manufacturing a gearwheel for clock movement, suitable for cooperating with a given first gearwheel. It relates also to a gearwheel for clock movement as such, obtained by such a method, and to a gear pair as such comprising such a wheel. It relates to a clock movement and to a wristwatch as such comprising such a gear pair. Finally, it relates to a system for manufacturing a gearwheel.

STATE OF THE ART

In the field of watchmaking, it is known practice to determine the profile of the teeth of the wheels and of the pinions of gear pairs on the basis of geometrical curves such as the cycloid, epicycloid, hypocycloid or the involute of a circle. The wheels and the pinions thus obtained are defined so as to transmit a rotational speed which remains substantially constant while a tooth is being driven. However, because of the friction forces which are inevitable as soon as such gear pairs are no longer in equilibrium, the torque transmitted while a tooth is being driven cannot be constant.

In the case for example of a watch movement, such gear pairs thus risk generating variations in the force transmitted by the escapement to the balance wheel, which can be reflected in variations of amplitude of the oscillations of the balance wheel and therefore a degradation of the chronometric efficiency.

Thus, the general aim of the present invention is to propose a gear pair wheel or pinion solution for clock movement which does not include the drawbacks of the prior art.

More specifically, one object of the present invention is to propose a solution for defining the geometry of a gear pair wheel or pinion for clock movement that is reliable, which makes it possible to guarantee an improved accuracy in the chronometric efficiency of the clock movement.

BRIEF DESCRIPTION OF THE INVENTION

To this end, the invention is based on a method for manufacturing a second gearwheel for clock movement, suitable for cooperating with a given first gearwheel, wherein it comprises the following steps:
  entering, via a human-machine interface associated with a computer, the flank of all or part of the teeth and the number of teeth of the first gearwheel,
  entering the number of teeth of the second gearwheel to be manufactured, and
  entering a friction coefficient of a pair of teeth in contact with the two gearwheels,
  considering a first equation defining the power or torque balance of at least one pair of teeth in contact with the two gearwheels, and
  considering a second kinematic equation defining the kinematic relationship of the at least one pair of teeth in contact with the two gearwheels, and
  solving the two equations by the computer, making it possible to obtain at least one value of the assumed constant torque ratio of the at least one pair of teeth in contact with the two gearwheels, and
  determining at least two points of the flank of at least one portion of the tooth of the second gearwheel of said at least one pair of teeth and constructing the flank of said tooth of the second gearwheel, for example by interpolation, notably by interpolation by a succession of straight lines and/or curves, notably of splines, between said points, and
  manufacturing the second gearwheel by a manufacturing device, this second gearwheel comprising teeth whose flank corresponds to the result of the preceding step.

The invention relates also to a system for manufacturing a gearwheel which implements the above method.

The invention relates also to a gearwheel for clock movement, suitable for cooperating with a given first gearwheel, wherein it comprises teeth whose flank is defined such that the torque ratio between the two meshed gearwheels is constant at least over a given angular pitch.

The invention relates also to a gear pair for clock movement, a clock movement for a wristwatch as such, comprising such a gearwheel.

The invention is more specifically defined by the claims.

BRIEF DESCRIPTION OF THE FIGURES

These objects, features and advantages of the present invention will be explained in detail in the following description of a particular embodiment given in a non limiting manner in relation to the attached figures in which.

To simplify the description by convention, the term "vertical direction" will be used for the direction parallel to a rotation axis of a studied gearwheel, and the horizontal direction will be used for a direction at right angles to the vertical direction.

The invention makes it possible to define, for any given first gearwheel, notably a conventional first gearwheel for clock movement, a conjugate second wheel whose teeth exhibit a geometry which allows the transmission of a torque in such a way that the ratio of the torques of the two gearwheels are almost constant or constant while the tooth is being driven when the two wheels are meshed.

Preferably, the geometry of the teeth of a wheel is defined by the peripheral ends of the wheel, that is to say the flank of the wheel. Preferably, this flank extends in a vertical direction. This geometry advantageously exhibits a section through a horizontal plane that is constant, in which each tooth exhibits a certain profile, the profile thus corresponding to the geometry obtained by the projection of the flank onto this horizontal plane. Thus, the term "flank", or in a misuse of language, "profile", will be used to denote the outline of all or part of a tooth of a gearwheel in the following description.

The embodiment describes a method that makes it possible to define a tooth profile for a driving or driven wheel, known, from a given conjugate first wheel.

More specifically, the invention makes it possible to define any gear pair consisting of a given first wheel R1, pivoted on a first axis A1, provided with a given first flank (or profile) of teeth $r_1$ and of a second wheel R2, pivoted on a second axis A2, meshed with the first wheel R1, and provided with a second flank (or profile) of teeth $r_2$ which is defined such that the torque ratio $j=C_2/C_1$ is constant over an angular pitch $p_1$, of the wheel R1, in which $C_1$ and $C_2$ represent the respective torques exerted by the wheels R1 and R2 measured at a point of contact of the line of meshing of the wheels R1 and R2, relative to the axes A1 and A2, for a given angular position of the first wheel R1.

The method will be described to define the geometry of at least one portion of tooth, for example at least one portion of the flank of at least one tooth of the second wheel R2. It can naturally be advantageously used to define the total geometry of at least one tooth, and preferably of all the teeth of the second wheel.

Figure 1:
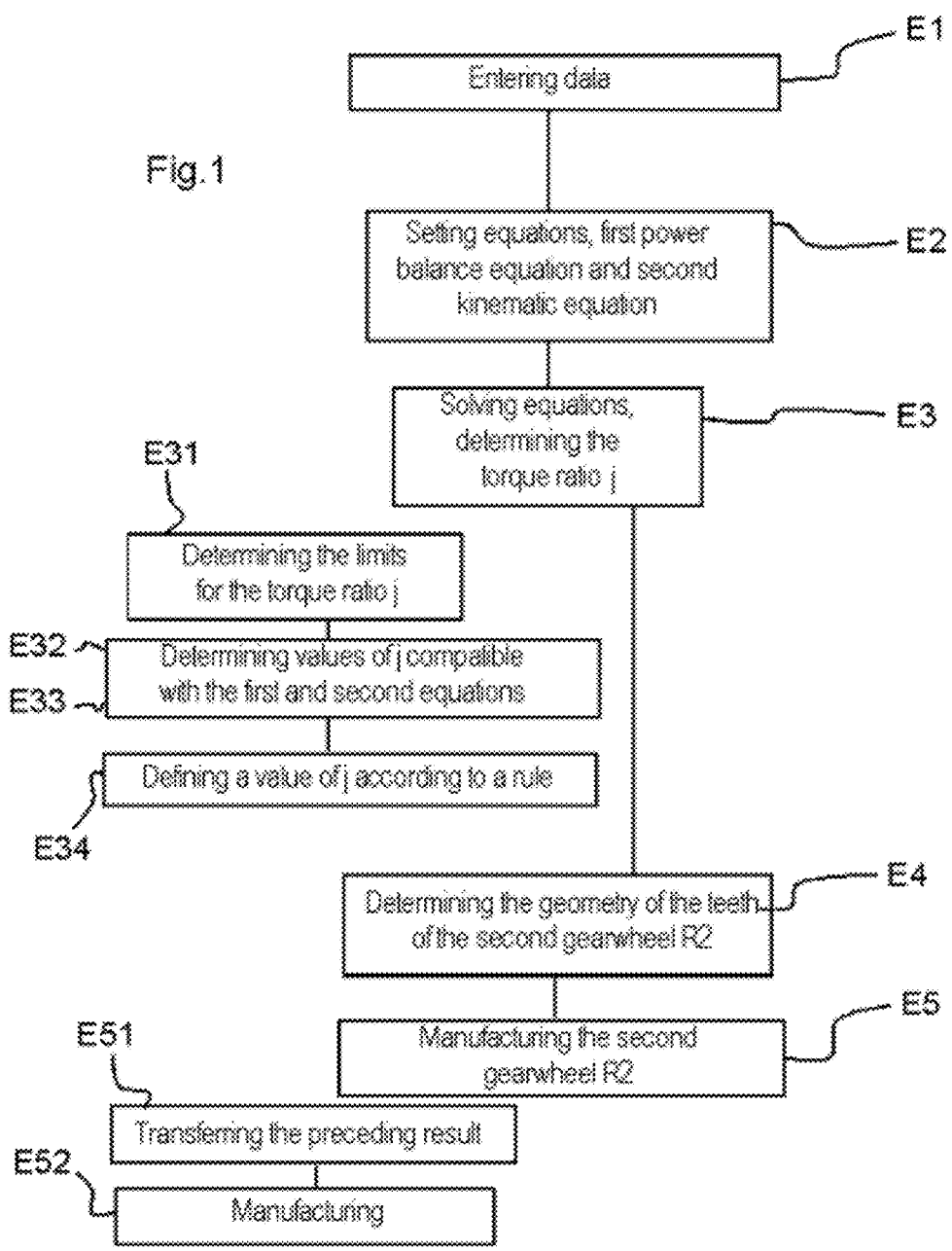
FIG. 1 schematically represents a flow diagram of the steps of the method for manufacturing a gearwheel for clock movement according to an embodiment of the present invention.

According to the general embodiment of the invention, the method for manufacturing a second gearwheel R2 for clock movement, suitable for cooperating with a given first gearwheel R1, comprises the following steps, as represented schematically by FIG. 1:

E1—entering, via a human-machine interface associated with a computer, the flank $r_1$ of all or part of the teeth and the number of teeth $z_1$ of the first gearwheel R1, entering the number of teeth $z_2$ of the second gearwheel R2 to be manufactured, and
  entering a friction coefficient $\mu$ of a pair of teeth in contact with the two gearwheels R1, R2, and E2—considering a first equation defining the power or torque balance of at least one pair of teeth in contact of the two gearwheels R1, R2, and
  considering a second kinematic equation defining the kinematic relationship of the at least one pair of teeth in contact of the two gearwheels R1, R2, and E3—solving the two equations by the computer, making it possible to obtain at least one value of the assumed constant torque ratio j of the at least one pair of teeth in contact with the two gearwheels R1, R2, and E4—determining at least two points of the flank of at least one portion of the tooth of the second gearwheel R2 of said at least one pair of teeth and constructing the flank $r_2$ of said tooth of the second gearwheel R2, for example by interpolation, notably by interpolation by a succession of straight lines and/or curves, notably of splines, between said points, and E5—manufacturing the second gearwheel R2 by a manufacturing device, this second gearwheel R2 comprising all or part of the teeth whose flank $r_2$ corresponds to the result of the preceding step.

According to this embodiment, the second step E2 consists in considering the following first power balance equation:

$$C_1 \cdot \omega_1 - C_2 \cdot \omega_2 + F_{frot} \cdot v_{12} = 0 \quad (1)$$

in which $C_1$ and $C_2$ represent the respective torques of a pair of teeth in contact with the two gearwheels R1, R2, measured at a point of contact of the meshing line of the two gearwheels R1, R2, relative to the respective rotation axes A1, A2 of the two gearwheels R1, R2, for a given angular position of the first gearwheel R1, $\omega_1$ and $\omega_2$ represent the respective angular velocities of the two gearwheels R1, R2, and $F_{frot}$ represents the friction force at the point of contact of the two gearwheels R1, R2.

Furthermore, the second step E2 consists in considering the following second kinematic equation:

$$\frac{\partial r_2}{\partial u} \times \frac{\partial r_2}{\partial \theta} \cdot v_{12} = 0 \quad (2)$$

in which $r_2$ represents at least one portion of the flank of a tooth of the second gearwheel R2 in contact with a tooth of the first gearwheel R1, expressed in a coordinate considering a curvilinear abscissa u and an angular quantity $\theta$ and
  $v_{12}$ represents the sliding velocity between the two gearwheels R1, R2 at their point of contact.

Such a kinematic equation (2) notably makes it possible to characterize the flank $r_2$ of a tooth of the second gearwheel R2 whose normal will be constantly at right angles to the sliding velocity.

According to a particular embodiment, the first gearwheel R1 constitutes a spur gear, that is to say whose profile is identical over all the planes at right angles to the rotation axis of the wheel. The straight line generating this flank is parallel to the rotation axis of the wheel. By convention, for simplicity, it is considered that the flank is then vertical. Similarly, the second gearwheel R2 is presented as a spur gear. It can mesh by rotation about a second rotation axis A2 parallel to the first rotation axis A1 of the first gearwheel R1.

Figure 4:
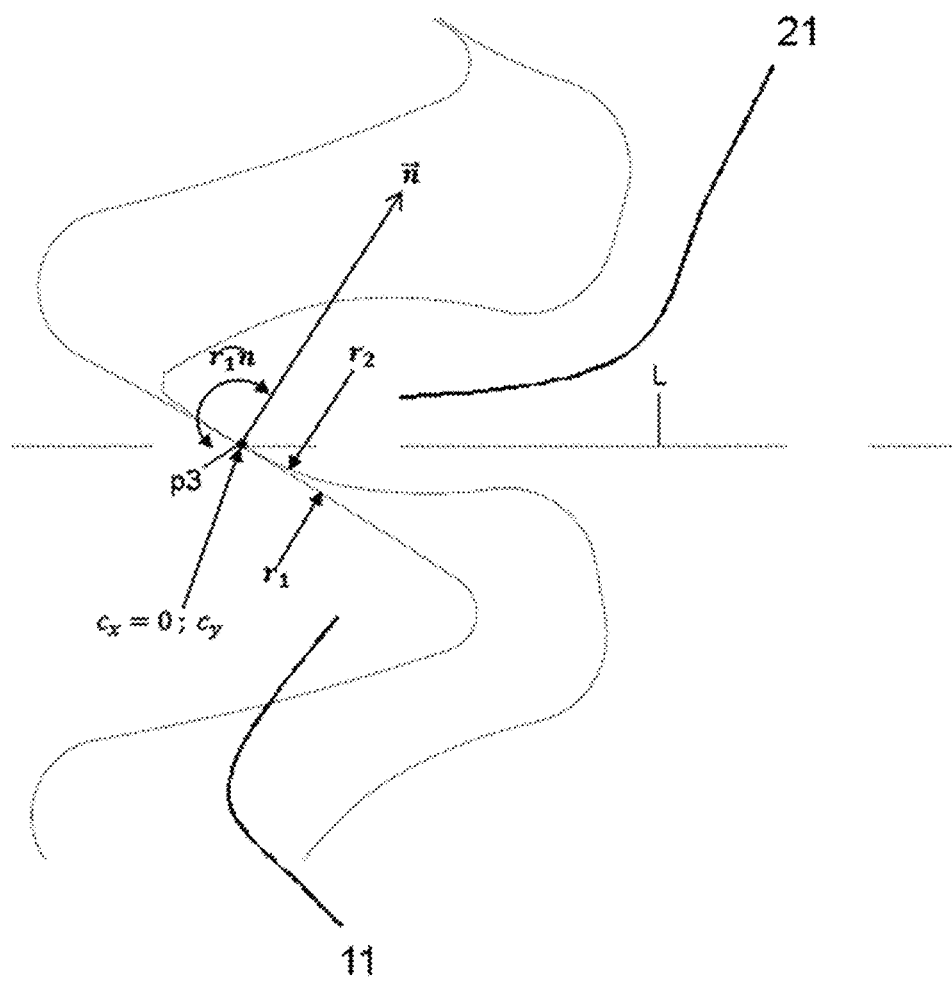
FIG. 4 represents an enlarged view of FIG. 3 at the level of the teeth in contact with the two gear wheels.

In this particular embodiment, the second step E2 considers the following first power balance equation, derived from the equation (1) above by involving a Coulomb friction model with a friction coefficient $\mu$ that is constant at the point of contact:

$$\frac{1+j}{1+\tilde{i}} = \frac{n_x z_1}{2(r_{ny} n_x - r_{nx} n_y)} - \frac{\mu z_1}{2 r_{1n}(\sin^{\widehat{r_i n}} \pm \mu \cos^{\widehat{r_i n}})} \frac{|r_{nx}|}{|r_{ny} n_x - r_{nx} n_y|} \quad (3)$$

in which
  $j = C_2/C_1 =$ constant
  $\tilde{i}$ represents the mean value of the transmission ratio between the two gearwheels R1, R2,
  $n_x$, $n_y$ represent the x and y components of the normal to the profile of the first gearwheel R1 at the point of contact between the two gearwheels R1, R2,
  the profile $r_{1n}$ of the teeth of the first gearwheel R1 is expressed by $r_{1n} = (r_{nx}, r_{ny})$, $r_{nx}$ and $r_{ny}$ being the x and y components of the normalized profile of $r_1$ at the point of contact between the two gearwheels R1, R2; and
  $\widehat{r_i n}$ represents the angle formed by the position vector of the point of the profile concerned and the normal n to the profile $r_1$ of the first gearwheel R1, as represented in the example of FIG. 4.

Figure 3:
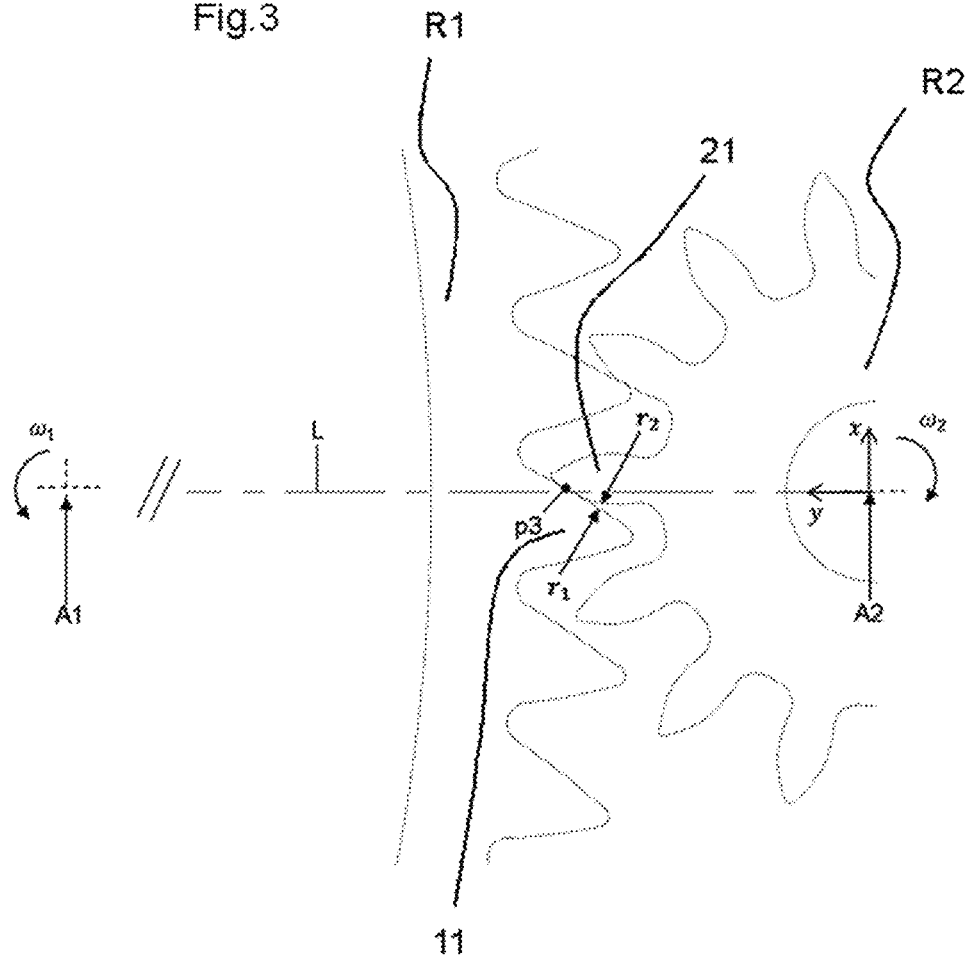

Note that, in this embodiment, each wheel exhibits a constant horizontal section, which defines a tooth profile. It is therefore sufficient to define this profile to determine the three-dimensional geometry of the wheels. For that, the equations address the profile, and consider an orthonormal Cartesian coordinate, in which the y axis of the ordinates is chosen on the center line, linking the rotation centers of the two wheels, as represented in the example of FIG. 3. Naturally, it would, in a variant, be possible to consider another coordinate.

Furthermore, in this particular embodiment, the second step E2 considers the following kinematic equation, which derives from the equation (2) above by a simplification based on the Lewis theorem:

$$\frac{c_x - r_x}{n_x} = \frac{c_y - r_y}{n_y} \quad (4)$$

in which the profile $r_1$ of the teeth of the first gearwheel R1 is expressed by $r_1=(r_x, r_y)$, $r_x$ and $r_y$ being the x and y components of the profile $r_1$ at the point of contact between the two gearwheels R1, R2;

$c_x$, $c_y$ represent the x and y components of the instantaneous center of rotation;

$n_x$, $n_y$ represent the x and y components of the normal to the profile of the first gearwheel R1 at the point of contact between the two gearwheels R1, R2.

In the particular case, as represented in FIG. 4, the following apply:

$$c_x = 0$$

$$c_y = \frac{E}{1+\bar{i}}$$

in which $$i = \frac{\omega_1(\phi_1)}{\omega_2(\phi_2)},$$

represents the instantaneous transmission ratio for each position $\phi_i$, of the wheel R1, E represents the center distance of the wheels R1, R2, which can also be expressed as:

$$E = \frac{m z_1 (1+\bar{i})}{2}, \text{ or } \bar{i} = \frac{z_2}{z_1}:$$

in which $z_1$ is the number of teeth of the wheel Ri and m the modulus of the teeth, and represents the mean value of the transmission ratio between the two gearwheels R1, R2.

On this basis, the above equation (4) can also, in a variant, be written as follows:

$$\frac{1+i}{1+\bar{i}} = \frac{n_x z_1}{2(r_{ny} n_x - r_{nx} n_y)} \quad (5)$$

in which i represents the instantaneous transmission ratio at a point of contact between the two gearwheels R1, R2, $\bar{i}$ represents the mean value of the transmission ratio between the two gearwheels R1, R2, $n_x$, $n_y$ represent the x and y components of the normal to the profile of the first gearwheel at the point of contact between the two gearwheels R1, R2, E represents the center distance of the two gearwheels R1, R2, the profile $r_{1n}$ of the teeth of the first gearwheel R1 is expressed by $r_{1n}=(r_{nx}, r_{ny})$, $r_{nx}$ and $r_{ny}$ being the x and y components of the normalized profile of $r_1$ at the point of contact between the two gearwheels R1, R2;

$$r_{1n} = (r_{nx}, r_{ny}) = \frac{r_1}{m}$$

Figure 2:
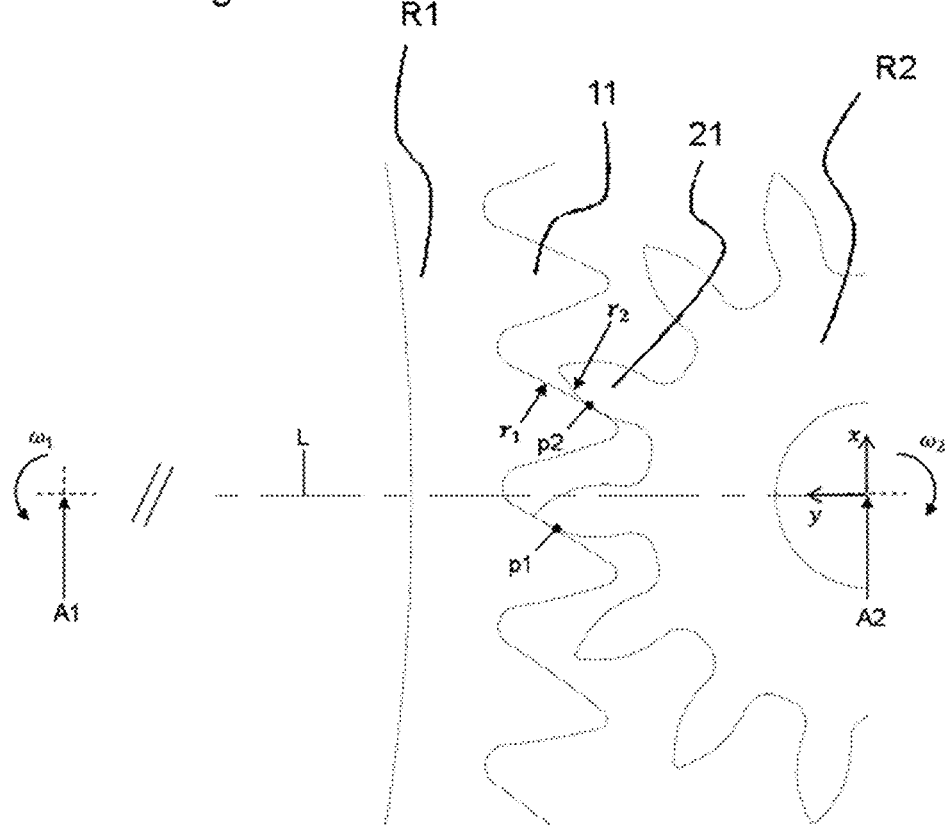
FIGS. 2 and 3 schematically represent a cross-sectional view through a horizontal plane of an example of a gear pair obtained by the manufacturing method according to the embodiment of the present invention.

To facilitate the solving of the above equations in the step E3, notably the search for the value of the torque ratio j, the method for manufacturing a second gearwheel R2 for clock movement comprises the following substeps:

E31: defining a possible minimum value $j_{min}$ and maximum value $j_{max}$ of the torque ratio j, by implementing the following computations:

$$j_{max} = \bar{i} = \frac{z_2}{z_1} \text{ and}$$

$$j_{min} = i_{min} = \frac{\omega_1(\phi)}{\omega_2(\phi)} r_1$$

in which $\phi$ represents the angle defining the point of contact of the profiles $r_1$ and $r_2$ on the line L of the centers of two gearwheels R1, R2, and $\omega_1$ and $\omega_2$ represent the angular velocities respectively of the two gearwheels R1, R2, as represented in FIG. 2.

This substep makes it possible to define a range of possible values for j, which use limits the following resolution;

E32—solving the first equation (3) for several points of the profile $r_1$ of the first gearwheel R1 to determine several values of the torque ratio j:

$$\frac{1+j}{1+\bar{i}} = \frac{n_x z_1}{2(r_{ny} n_x - r_{nx} n_y)} - \frac{\mu z_1}{2 r_{1n}(\sin \vec{r}_i \vec{n} \pm \mu \cos \vec{r}_i \vec{n})} \frac{|r_{nx}|}{|r_{ny} n_x - r_{nx} n_y|} \quad (3)$$

E33—identifying the torque ratio j values compatible with the second kinematic equation;

E34—selecting a torque ratio j value from the compatible torque ratio values identified in the preceding step according to a predefined rule, such as, for example, maximization of the mean efficiency, making it possible to maximize the mean efficiency $$\bar{\eta} = \frac{j}{\bar{i}}.$$

According to this embodiment, the fourth step E4 comprises the solving of the second kinematic equation by considering the selected torque ratio value j to be constant to obtain at least points of the profile $r_2$ of at least one portion of tooth of the second gearwheel R2.

Also, according to the embodiment, the first step E1 comprises an additional substep consisting in entering the desired resolution for the computation of the flank $r_2$ of the second gearwheel R2 and the step E4 allows a discrete resolution, defining points of the flank $r_2$ of the second gearwheel R2 according to this resolution entered in the first step E1.

To facilitate the subsequent manufacture, the fourth step E4 according to the embodiment comprises a substep consisting in creating a digital data file digitally representing the flank $r_2$ of the second gearwheel R2.

In practice, the solving of the equation is done by a digital solving method, implemented by a computer.

Then, the fifth step E5 of manufacturing the second gearwheel R2 by a manufacturing device comprises a substep E51 of transferring the result of the fourth step to a manufacturing device, notably in the form of a digital data transfer by a communication device of the computer implementing the third and fourth steps E3, E4. It then comprises a substep E52 of manufacturing the second gearwheel R2 by a manufacturing device, by material removal, notably by machining, or by material addition, notably by electroforming.

Optionally, the method can comprise an additional substep consisting in reconstructing the profile $r_2$ of the second gearwheel R2 for a non-unitary modulus m predefined or entered by a human-machine interface. Preferably, the modulus m satisfies the following conditions: 0.03<m<0.8.

FIGS. 2 to 4 illustrate the implementation of the method described previously for a gear pair comprising two spur gears R1, R2, the horizontal cross-sectional views of which are reproduced. This gear pair is created from a known first driving gear wheel R1, centered at A1, and whose tooth profile $r_1$ is a traditional profile, as involute of a circle with a pressure angle of 30°. Such a profile is advantageously chosen in order to minimise the sensitivity of the meshing to center distance variations.

The input parameters associated with the first gearwheel R1, entered in the step E1, are as follows:
the profile $r_1$ of the teeth 11, which are all identical, of the first gearwheel R1;

$$r_1(u) = r_{b1}\begin{pmatrix} \cos(u) + u\sin(u) \\ \sin(u) - u\cos(u) \end{pmatrix},$$

in which $r_{bi}$ is the basic radius of the involute,
the number of teeth: $Z_1$=98.

Furthermore, the constant friction coefficient is entered: µ=0.2.

The driven second gearwheel R2, to be manufactured, is centered at A2. Its tooth profile $r_2$ is the profile to be determined according to the method explained above. More specifically, this method is implemented to determine the interior portion of the profile of a tooth 21 of this second gearwheel R2, the portion which remains in contact with a tooth 11 of the first gearwheel R1 between the point p1, corresponding substantially to the start of meshing of the pair of teeth 11, 21 of the gearwheels R1, R2, up to the point p2, corresponding substantially to the end of meshing of the pair of teeth 11, 21 of the gearwheels R1 and R2, over an angular pitch of the driving wheel R1 revolving in a counter clockwise direction, as represented in FIG. 2.

FIGS. 3 and 4 illustrate an intermediate position of the pair of teeth 11, 21 in contact, at a point p3 positioned on the line L of the centers.

The solving of the equations and the implementation of the method described previously makes it possible to obtain the following results:
j=6.811
points defining the conjugate profile $r_2$ of the portion of tooth 21 considered. This portion is completed by interpolation between these points, then the complete tooth is drawn, notably by considering a symmetry about its central axis. Finally, all the teeth of the second gearwheel R2 are chosen identical to this determined tooth 21. Thus, the result obtained is as represented by FIGS. 2 to 4. It should be noted that the number of points determined (step E4) is greater than or equal to 2, and chosen according to a trade-off between the desired accuracy, which increases as the number of points increases, and the desired speed of computation, which decreases as the number of points increases.

Naturally, the method described above exhibits a complex mathematical resolution which may require simplifications, and makes it possible to define a second gearwheel R2 such that the transmission of a torque ratio, theoretically constant, is in practice substantially constant while the tooth is being driven, that is to say that the variation of the torque ratio j is less than or equal to a variation of 2%, even 1.5%, while a tooth is being driven. Furthermore, it will be noted that, in the particular case represented by FIGS. 2 to 4, the variation Δj of the torque ratio is less than 1.5% for a variation ΔE of center distance of the order of 1.5% relative to the nominal center distance E.

In comparison, in the case of a conventional gear pair of the prior art comprising two wheels provided with a profile as involute of a circle, the variation of the torque ratio is of the order of 8% with nominal center distance, and of the order of 9% for a variation ΔE of center distance of the order of 1.5% relative to the nominal center distance E.

Advantageously, the tooth profile $r_2$ of the second gearwheel R2 can be provided to be meshed by a standardized tooth profile $r_1$ of the first gearwheel R1, in particular a profile $r_1$ as involute of a circle or derived from the involute of a circle, for example a pressure angle of between 5° and 50°. Such a profile is almost insensitive to center distance variations, as represented for example by FIGS. 2 to 4. In a variant, a first wheel R1 based on a geometrical curve such as a cycloid, an epicycloid or a hypocycloid, can be used. In a variant, the first profile $r_1$ is defined by an NIHS standard or derived from such a standard, notably a profile according to one of the NIHS 20-02 or NIHS 20-25 standards. In a variant, the profile $r_1$ is derived from a succession of circular arcs and of straight lines. Note that, in these examples, the profile of the teeth of the conjugate second gearwheel, determined by the method according to the invention, will be different from the profile of the teeth of the first gearwheel.

The method described previously will advantageously be used to define a gearwheel for which all the teeth are identical. In addition, each tooth advantageously has a profile with a horizontal axis of symmetry and/or a flank with a vertical plane of symmetry. In a variant however, the invention does not exclude the manufacturing of wheels comprising teeth of different geometries, and/or asymmetrical teeth. The wheel itself can be asymmetrical, for example having teeth only over a part of its perimeter.

Also, the method can be implemented to achieve the technical effect of constant torque ratio over the entire meshing angular amplitude of the two teeth, that is to say from the start to the end of meshing (from the point p1 to the point p2 to return to the example of FIG. 2) or only over a significant portion of this angular amplitude, notably at least over half of this meshing travel between a pair of teeth. Consequently constant torque ratio between two gearwheels will therefore be understood to be a torque ratio that is constant, or substantially constant, between two particular meshed teeth, over a not-inconsiderable travel of all of their meshing line.

The invention relates also to a gear pair wheel or pinion as such, manufactured by a method as described previously. Such a wheel or pinion forms part of a clock movement, and can more specifically belong to a watch work movement.

The invention relates also to a gear pair comprising any given first gearwheel R1, which can be one of the conventional wheels out of the examples given previously or any other wheel, and a conjugate second wheel R2 defined by the method described previously, such that the torque ratio j between the two gearwheels R1, R2 is constant or substantially constant, at least over a given angular pitch.

The flanks (or profiles) $r_1$, $r_2$ of the teeth of the two gearwheels R1, R2 satisfy the following equation:

$$\tilde{i} = \frac{z_2}{z_1} = \frac{1}{p_1} \int_{\phi_1}^{\phi_1+p_1} i(\phi, j) d\phi \qquad (6)$$

in which $\phi$ represents any position of the first gearwheel R1 over an angular pitch $p_1$ of said first gearwheel R1 from a starting position $\phi_1$, and $\tilde{i}$ represents the mean value of the transmission ratio between the two gearwheels R1, R2.

According to a particular embodiment, in this gear pair for clock movement, the respective rotation axes A1, A2 of the two gearwheels R1, R2 are substantially parallel and the two gearwheels R1, R2 are spur gears.

In this case, the respective profiles $r_1$, $r_2$ of the two gearwheels R1, R2 advantageously satisfy the following equations, already described previously:

$$\frac{1+i}{1+\tilde{i}} = \frac{n_x z_1}{2(r_{ny} n_x - r_{nx} n_y)} \text{ and} \qquad (5)$$

$$\frac{1+j}{1+\tilde{i}} = \frac{n_x z_1}{2(r_{ny} n_x - r_{nx} n_y)} - \frac{\mu z_1}{2r_{1n}(\sin\widehat{r_1 n} \pm \mu \cos\widehat{r_1 n})} \frac{|r_{nx}|}{|r_{ny} n_x - r_{nx} n_y|} \qquad (3)$$

in which:

i represents the instantaneous transmission ratio at a point of contact between the two gearwheels R1, R2, $\tilde{i}$ represents the mean value of the transmission ratio between the two gearwheels R1, R2, $n_x$, $n_y$ represent the x and y components of the normal to the profile of the first gearwheel at the point of contact between the two gearwheels R1, R2, the profile $r_{1n}$ of the teeth of the first gearwheel R1 is expressed by $r_{1n}=(r_{nx}, r_{ny})$, $r_{nx}$ and $r_{ny}$ being the x and y components of the normalized profile of $r_1$ at the point of contact between the two gearwheels R1, R2;

$\widehat{r_1 n}$ represents the angle formed by the position vector of the point of the profile concerned and the normal n to the profile $r_1$ of the first gearwheel R1.

The invention relates also to a clock movement and to a wristwatch, comprising a gear pair such as described above.

The invention relates also to a manufacturing system, which comprises software and hardware components, notably at least one computer, provided with a human-machine interface for entering data, for example during the first step E1 of the method, an electronic memory for storing values entered, computation parameters and computation results, notably digital data representing the geometry of a gearwheel to be manufactured, and a communication device for transmitting said results. This manufacturing system comprises a manufacturing device for manufacturing a gear pair wheel or pinion as such, for example by machining or material addition.

The embodiment of the invention thus offers the advantage of making it possible to manufacture an optimal gearwheel from any first gearwheel, notably comprising a standardized profile, the second wheel, meshed with the first, being provided with a profile that is conjugate in terms of the torque with that of the first.

The invention claimed is:

1. A gear pair for clock movement, comprising:
   a given first gearwheel (R1);
   a second gearwheel (R2) suitable for cooperating with the given first gearwheel (R1), wherein the second gearwheel (R2) comprises teeth whose flank is defined so that the torque ratio j between the two gearwheels (R1, R2) is constant at least over a given angular pitch,
   wherein a modulus m of the teeth of the first gearwheel (R1) satisfies: 0.03<m<0.8.

2. The gear pair for clock movement as claimed in claim 1, wherein the respective rotation axes (A1, A2) of the two gearwheels (R1, R2) are substantially parallel and wherein the two gearwheels (R1, R2) constitute spur gears.

3. The gear pair for clock movement as claimed in claim 2, wherein the flanks $r_1$, $r_2$ of the teeth of the two gearwheels (R1, R2) satisfy the following equations:

$$\frac{1+i}{1+\tilde{i}} = \frac{n_x z_1}{2(r_{ny} n_x - r_{nx} n_y)} \text{ and} \qquad (5)$$

$$\frac{1+j}{1+\tilde{i}} = \frac{n_x z_1}{2(r_{ny} n_x - r_{nx} n_y)} - \frac{\mu z_1}{2r_{1n}(\sin\widehat{r_1 n} \pm \mu \cos\widehat{r_1 n})} \frac{|r_{nx}|}{|r_{ny} n_x - r_{nx} n_y|} \qquad (3)$$

in which:

i represents the instantaneous transmission ratio at a point of contact between the two gearwheels (R1, R2), $\tilde{i}$ represents the mean value of the transmission ratio between the two gearwheels (R1, R2), $n_x$, $n_y$ represent the x and y components of the normal to the profile of the first gearwheel at the point of contact between the two gearwheels (R1, R2), the profile $r_{1n}$ of the teeth of the first gearwheel (R1) is expressed by $r_{1n}=(r_{nx}, r_{ny})$, $r_{nx}$ and $r_{ny}$ being the x and y components of the normalized profile of the flank $r_1$ at the point of contact between the two gearwheels (R1, R2), $\widehat{r_1 n}$ represents the angle formed by the position vector of the point of the profile concerned and the normal n of the flank $r_1$ of the first gearwheel (R1).

4. The gear pair for clock movement as claimed in claim 1,
wherein all or part of the teeth of the first gearwheel (R1) exhibit:
   a profile as involute of a circle, or
   a profile in cycloid, epicycloid or hypocycloid form, or
   a profile defined by an NIHS standard,
and wherein the profile of at least one tooth of the second gearwheel (R2) is different from the profile of the teeth of the first gearwheel (R1).

5. A clock movement or wristwatch comprising at least one gear pair as claimed in claim 1.

6. A method for manufacturing a second gearwheel (R2) for clock movement, suitable for cooperating with a given first gearwheel (R1), wherein the method comprises the following actions (E1) to (E4):
   (E1)
      entering, via a human-machine interface associated with a computer, the flank $r_1$ of all or part of the teeth and the number of teeth $z_1$ of the first gearwheel (R1), entering the number of teeth $z_2$ of the second gearwheel (R2) to be manufactured, and
entering a friction coefficient $\mu$ of a pair of teeth in contact with the two gearwheels (R1, R2),
(E2)
considering a first equation defining the power or torque balance of at least one pair of teeth in contact with the two gearwheels (R1, R2), and
considering a second kinematic equation defining the kinematic relationship of the at least one pair of teeth in contact with the two gearwheels (R1, R2),
(E3)
solving the two equations by the computer, making it possible to obtain at least one value of the assumed constant torque ratio j of the at least one pair of teeth in contact with the two gearwheels (R1, R2),
(E4)
determining at least two points of the flank of at least one portion of the tooth of the second gearwheel (R2) of the at least one pair of teeth and constructing the flank $r_2$ of the tooth of the second gearwheel (R2), and
(E5)
manufacturing the second gearwheel (R2) by a manufacturing device, the second gearwheel (R2) comprising teeth whose flank $r_2$ corresponds to the result of the actions (E4),
so as to obtain the gearwheel according to claim 1.

7. The method for manufacturing a second gearwheel (R2) for clock movement as claimed in claim 6,
wherein the second actions (E2) comprise considering the following first power balance equation:

$$C_1 \cdot \omega_1 - C_2 \cdot \omega_2 + F_{frot} \cdot v_{12} = 0 \quad (1)$$

in which
$C_1$ and $C_2$ represent the respective torques of the two gearwheels (R1, R2), measured at a point of contact of the line of meshing of the two gearwheels (R1, R2), relative to the respective rotation axes (A1, A2) of the two gearwheels (R1, R2), for a given angular position of the first gearwheel (R1),
$\omega_1$ and $\omega_2$ represent the respective angular velocities of the two gearwheels (R1, R2), and
$F_{frot}$ represents the friction force at the point of contact of the two gearwheels (R1, R2),
and wherein the second actions (E2) comprise considering the following second kinematic equation:

$$\frac{\partial r_2}{\partial u} \times \frac{\partial r_2}{\partial \theta} \cdot v_{12} = 0 \quad (2)$$

in which
$r_2$ represents at least one portion of the flank of a tooth of the second gearwheel (R2) in contact with a tooth of the first gearwheel (R1), expressed in a coordinate considering a curvilinear abscissa u and an angular quantity $\theta$, and
$v_{12}$ represents the sliding velocity between the two gearwheels (R1, R2) at their point of contact.

8. The method for manufacturing a second gearwheel (R2) for clock movement as claimed in claim 6,
wherein, in the case where the first gearwheel (R1) is a spur gear, the second gearwheel (R2) is a spur gear capable of meshing by rotation about a second rotation axis (A2) parallel to the first rotation axis (A1) of the first gearwheel (R1),
and wherein the second actions (E2) comprise considering the following first equation:

$$\frac{1+j}{1+\tilde{i}} = \frac{n_x z_1}{2(r_{ny}n_x - r_{nx}n_y)} - \frac{\mu z_1}{2r_{1n}(\sin\widehat{r_1 n} \pm \mu \cos \widehat{r_1 n})} \frac{|r_{nx}|}{|r_{ny}n_x - r_{nx}n_y|} \quad (3)$$

in which $$j = \frac{c_2}{c_1} = \text{constant}$$

$\tilde{i}$ represents the mean value of the transmission ratio between the two gearwheels (R1, R2),
$n_x$, $n_y$ represent the x and y components of the normal to the profile of the first gearwheel (R1), at the point of contact between the two gearwheels (R1, R2),
the profile $r_{1n}$ of the teeth of the first gearwheel (R1) is expressed by $r_{1n} = (r_{nx}, r_{ny})$, $r_{nx}$ and $r_{ny}$ being the x and y components of the normalized profile of $r_1$ at the point of contact between the two gearwheels (R1, R2), and
$\widehat{r_1 n}$ represents the angle formed by the position vector of the point of the profile concerned and the normal n to the flank $r_1$ of the first gearwheel (R1).

9. The method for manufacturing a second gearwheel (R2) for clock movement as claimed in claim 8, wherein the third actions (E3) comprise the following actions (E31) to (E34):
(E31)
defining a possible minimum value $j_{min}$ and maximum value $j_{max}$ of the torque ratio j between the gearwheels (R1, R2), by implementing the following computations:

$$j_{max} = \tilde{i} = \frac{z_2}{z_1} \text{ and}$$

$$j_{min} = i_{min} = \frac{\omega_1(\phi)}{\omega_2(\phi)} r_1$$

in which
$\phi$ represents the angle defining the point of contact of the flanks $r_1$ and $r_2$ on the line of the centers of the two gearwheels (R1, R2), and
$\omega_1$ and $\omega_2$ represent the angular velocities respectively of the two gearwheels (R1, R2);
(E32)
solving the first equation (3) for several points of the flank $r_1$ of the first gearwheel (R1) to determine several values of the torque ratio j:

$$\frac{1+j}{1+\tilde{i}} = \frac{n_x z_1}{2(r_{ny}n_x - r_{nx}n_y)} - \frac{\mu z_1}{2r_{1n}(\sin\widehat{r_1 n} \pm \mu \cos \widehat{r_1 n})} \frac{|r_{nx}|}{|r_{ny}n_x - r_{nx}n_y|}$$

(E33)
identifying the torque ratio j values compatible with the second kinematic equation;
(E34)
selecting a torque ratio j value from the compatible torque ratio j values identified in the preceding actions (E33) according to a predefined rule.

10. The method for manufacturing a second gearwheel (R2) for clock movement as claimed in claim 9, wherein, in actions (E34), the predefined rule is a maximization of the mean efficiency.

11. The method for manufacturing a second gearwheel (R2) for clock movement as claimed in claim 6,
wherein, in the case where the first gearwheel (R1) is a spur gear, the second gearwheel (R2) is a spur gear capable of meshing by rotation about a second rotation axis (A2) parallel to the first rotation axis (A1) of the first gearwheel (R1),
and wherein the second actions (E2) comprise considering the following kinematic equation:

$$\frac{c_x - r_x}{n_x} = \frac{c_y - r_y}{n_y} \qquad (4)$$

in which
the profile $r_1$ of the teeth of the first gearwheel (R1) is expressed by $r_1 = (r_x, r_y)$, $r_x$ and $r_y$ being the x and y components of the profile $r_1$ at the point of contact between the two gearwheels (R1, R2);
$c_x$, $c_y$ represent the x and y components of the instantaneous center of rotation;
$n_x$, $n_y$ represent the x and y components of the normal to the profile of the first gearwheel at the point of contact between the two gearwheels (R1, R2),
or wherein the second actions (E2) comprise considering the following kinematic equation:

$$\frac{1+i}{1+\bar{i}} = \frac{n_x z_1}{2(r_{ny} n_x - r_{nx} n_y)} \qquad (5)$$

in which
i represents the instantaneous transmission ratio at a point of contact between the two gearwheels (R1, R2),
$\bar{i}$ represents the mean value of the transmission ratio between the two gearwheels (R1, R2),
$n_x$, $n_y$ represent the x and y components of the normal to the profile of the first gearwheel at the point of contact between the two gearwheels (R1, R2),
E represents the center distance of the two gearwheels (R1, R2),
the profile $r_{1n}$ of the teeth of the first gearwheel (R1) is expressed by $r_{1n} = (r_{nx}, r_{ny})$, $r_{nx}$ and $r_{ny}$ being the x and y components of the normalized profile of the flank $r_1$ at the point of contact between the two gearwheels (R1, R2).

12. The method for manufacturing a second gearwheel (R2) for clock movement as claimed in claim 6,
wherein the first actions (E1) additionally comprise entering the desired resolution for the computation of the flank $r_2$ of the second gearwheel (R2),
and wherein the fourth actions (E4) allow a discrete resolution, defining points of the flank $r_2$ of the second gearwheel (R2) according to the resolution entered in the first actions (E1).

13. The method of manufacturing a second gearwheel (R2) for clock movement as claimed in claim 6,
wherein the fourth actions (E4) additionally comprise creating a digital data file digitally representing the flank $r_2$ of the second gearwheel (R2).

14. The method for manufacturing a second gearwheel (R2) for clock movement as claimed in claim 6, wherein the fifth actions (E5) of manufacturing the second gearwheel (R2) by a manufacturing device comprise the following actions (E51) and (E52):
(E51)
transferring the result of the fourth actions (E4) to a manufacturing device, and (E52)
manufacturing the second gearwheel (R2) by at least one of material removal and material addition.

15. The method for manufacturing a second gearwheel (R2) for clock movement as claimed in claim 6, wherein the actions (E4) comprise determining at least two points of the flank of at least one portion of the tooth of the second gearwheel (R2) of the at least one pair of teeth and constructing the flank $r_2$ of the tooth of the second gearwheel (R2) by interpolation between the points.

16. The method for manufacturing a second gearwheel (R2) for clock movement as claimed in claim 15, wherein the interpolation is an interpolation by a succession of straight lines and/or curves.

17. The method for manufacturing a second gearwheel (R2) for clock movement as claimed in claim 15, wherein the interpolation is an interpolation by a succession of straight lines and/or curves of splines.

18. A system for manufacturing a second gearwheel (R2) for clock movement, suitable for cooperating with a given first gearwheel (R1), wherein the system comprises a computer and a manufacturing device, and implements a method for manufacturing a second gearwheel (R2) for clock movement, suitable for cooperating with a given first gearwheel (R1), wherein the method comprises the following actions (E1) to (E4):
(E1)
entering, via a human-machine interface associated with a computer, the flank r1 of all or part of the teeth and the number of teeth z1 of the first gearwheel (R1),
entering the number of teeth z2 of the second gearwheel (R2) to be manufactured, and
entering a friction coefficient µ of a pair of teeth in contact with the two gearwheels (R1, R2),
(E2)
considering a first equation defining the power or torque balance of at least one pair of teeth in contact with the two gearwheels (R1, R2), and
considering a second kinematic equation defining the kinematic relationship of the at least one pair of teeth in contact with the two gearwheels (R1, R2),
(E3)
solving the two equations by the computer, making it possible to obtain at least one value of the assumed constant torque ratio j of the at least one pair of teeth in contact with the two gearwheels (R1, R2),
(E4)
determining at least two points of the flank of at least one portion of the tooth of the second gearwheel (R2) of the at least one pair of teeth and constructing the flank r2 of the tooth of the second gearwheel (R2), and
(E5)
manufacturing the second gearwheel (R2) by a manufacturing device, the second gearwheel (R2) comprising teeth whose flank r2 corresponds to the result of the actions (E4),
so as to obtain the gearwheel according to claim 1.

19. A gear pair for clock movement, comprising:
a given first gearwheel (R1);
a second gearwheel (R2) suitable for cooperating with the given first gearwheel (R1), wherein the second gearwheel (R2) comprises teeth whose flank is defined so that the torque ratio j between the two gearwheels (R1, R2) is constant at least over a given angular pitch,
wherein a modulus m of the teeth of the first gearwheel (R1) satisfies: 0.03<m<0.8,
wherein at least two points of a flank of at least one portion of at least one of the teeth of the gearwheel (R2) are determined by a method comprising the following actions (E1) to (E4):
(E1)
  entering, via a human-machine interface associated with a computer, the flank r1 of all or part of the teeth and the number of teeth z1 of the first gearwheel (R1),
  entering the number of teeth z2 of the gearwheel (R2) to be manufactured, and
  entering a friction coefficient μ of a pair of teeth in contact with the two gearwheels (R1, R2),
(E2)
  considering a first equation defining the power or torque balance of at least one pair of teeth in contact with the two gearwheels (R1, R2), and
  considering a second kinematic equation defining the kinematic relationship of the at least one pair of teeth in contact with the two gearwheels (R1, R2),
(E3)
  solving the two equations by the computer, making it possible to obtain at least one value of the assumed constant torque ratio j of the at least one pair of teeth in contact with the two gearwheels (R1, R2),
(E4)
  determining the at least two points of the flank of the at least one portion of the tooth of the gearwheel (R2).

20. A gear pair for clock movement, comprising:
a given first gearwheel (R1);
a second gearwheel (R2) suitable for cooperating with the given first gearwheel (R1), wherein the gearwheel (R2) comprises teeth whose flank is defined so that the torque ratio j between the two gearwheels (R1, R2) is constant at least over a given angular pitch,
wherein respective rotation axes (A1, A2) of the two gearwheels (R1, R2) are substantially parallel and wherein the two gearwheels (R1, R2) constitute spur gears, and
wherein flanks $r_1$, $r_2$ of the teeth of the two gearwheels (R1, R2) satisfy the following equations:

$$\frac{1+i}{1+\tilde{i}} = \frac{n_x z_1}{2(r_{ny}n_x - r_{nx}n_y)} \text{ and} \quad (5)$$

-continued
$$\frac{1+j}{1+\tilde{i}} = \frac{n_x z_1}{2(r_{ny}n_x - r_{nx}n_y)} - \frac{\mu z_1}{2r_{1n}(\sin\widehat{r_1 \tilde{n}} \pm \mu \cos\widehat{r_1 \tilde{n}})} \frac{|r_{nx}|}{|r_{ny}n_x - r_{nx}n_y|} \quad (3)$$

in which:
  i represents the instantaneous transmission ratio at a point of contact between the two gearwheels (R1, R2),
  ĩ represents the mean value of the transmission ratio between the two gearwheels (R1, R2),
  $n_x$, $n_y$ represent the x and y components of the normal to the profile of the first gearwheel at the point of contact between the two gearwheels (R1, R2),
  the profile $r_{1n}$ of the teeth of the first gearwheel (R1) is expressed by $r_{1n}=(r_{nx},r_{ny})$, $r_{nx}$ and $r_{ny}$ being the x and y components of the normalized profile of the flank $r_1$ at the point of contact between the two gearwheels (R1, R2),
  $\widehat{r_1 \tilde{n}}$ represents the angle formed by the position vector of the point of the profile concerned and the normal n of the flank $r_1$ of the first gearwheel (R1).

21. A method for manufacturing a second gearwheel (R2) for clock movement, suitable for cooperating with a given first gearwheel (R1), wherein the method comprises the following actions (E1) to (E4):
(E1)
  entering, via a human-machine interface associated with a computer, the flank $r_1$ of all or part of the teeth and the number of teeth $z_1$ of the first gearwheel (R1),
  entering the number of teeth $z_2$ of the second gearwheel (R2) to be manufactured, and
  entering a friction coefficient μ of a pair of teeth in contact with the two gearwheels (R1, R2),
(E2)
  considering a first equation defining the power or torque balance of at least one pair of teeth in contact with the two gearwheels (R1, R2), and
  considering a second kinematic equation defining the kinematic relationship of the at least one pair of teeth in contact with the two gearwheels (R1, R2),
(E3)
  solving the two equations by the computer, making it possible to obtain at least one value of the assumed constant torque ratio j of the at least one pair of teeth in contact with the two gearwheels (R1, R2),
(E4)
  determining at least two points of the flank of at least one portion of the tooth of the second gearwheel (R2) of the at least one pair of teeth and constructing the flank $r_2$ of the tooth of the second gearwheel (R2), and
(E5)
  manufacturing the second gearwheel (R2) by a manufacturing device, the second gearwheel (R2) comprising teeth whose flank $r_2$ corresponds to the result of the actions (E4),
so as to obtain the gearwheel according to claim 20.

* * * * *